United States Patent [19]
Behl et al.

[11] Patent Number: 6,108,195
[45] Date of Patent: Aug. 22, 2000

[54] COMPUTER SYSTEM HAVING THIN-PROFILE DISPLAY WITH REMOVABLE CONNECTOR ASSEMBLY

[75] Inventors: Sunny Behl, San Jose; Chris Erwin, Fremont, both of Calif.

[73] Assignee: Inclose Design, Inc., San Jose, Calif.

[21] Appl. No.: 09/209,976

[22] Filed: Dec. 11, 1998

[51] Int. Cl.$^7$ ....................................... G06F 1/16
[52] U.S. Cl. .......................... 361/681; 345/903; 345/905; 248/917; 248/919; 248/920; 248/923
[58] Field of Search ................... 361/681, 682; 345/169, 905, 168; 248/917, 918, 919, 920, 921, 922, 923

[56] References Cited

U.S. PATENT DOCUMENTS

| | | | |
|---|---|---|---|
| D. 253,594 | 12/1979 | Antenbring | 14/114 |
| 4,438,458 | 3/1984 | Munscher | 361/681 |
| 5,144,290 | 9/1992 | Honda et al. | 361/681 |
| 5,199,888 | 4/1993 | Condra et al. | 361/683 |
| 5,229,920 | 7/1993 | Spaniol et al. | 361/681 |
| 5,262,759 | 11/1993 | Moriconi et al. | 361/681 |
| 5,345,362 | 9/1994 | Winkler | 361/681 |
| 5,404,182 | 4/1995 | Nomura | 248/920 |
| 5,497,296 | 3/1996 | Satou et al. | 361/681 |
| 5,537,290 | 7/1996 | Brown et al. | 361/681 |
| 5,652,694 | 7/1997 | Martin | 361/681 |
| 5,668,570 | 9/1997 | Ditzik | 361/681 |
| 5,682,645 | 11/1997 | Watabe et al. | 361/681 |
| 5,709,360 | 1/1998 | Rosen | 248/921 |
| 5,796,576 | 8/1998 | Kim | 361/681 |
| 5,870,280 | 2/1999 | Cho | 361/681 |
| 5,923,528 | 7/1999 | Lee | 361/681 |
| 6,016,171 | 1/2000 | Tsao | 361/681 |

*Primary Examiner*—Gerald Tolin
*Assistant Examiner*—John Reed
*Attorney, Agent, or Firm*—Kevin H. Fortin

[57] ABSTRACT

A thin-profile display in combination with a desktop computer housing includes a computer housing having a top, a bottom and lateral sides. A post removeably attaches to the top. The top includes a corrugated portion to reinforce the top, supporting the post. The corrugated portion preferably, has fingers extending radially outward from the post. The post folds with respect to the top and is adjustable in length. A thin-profile display adjustably attached to the post. The display includes a LCD screen having a profile thickness "t" of less than four inches.

14 Claims, 8 Drawing Sheets

COMPUTER SYSTEM HAVING THIN-PROFILE DISPLAY WITH REMOVABLE CONNECTOR ASSEMBLY

FIELD OF THE INVENTION

The present invention pertains to removable connections between thin-profile displays to a base such as a computer housing.

BACKGROUND OF THE INVENTION

Thin-profile displays are becoming more popular, due in part to advancements in liquid crystal display (LCD) technology, which is used for most thin-profile displays. Thin-profile displays are in many ways, advantageous over the cathode ray tubs (CRT's) of the past. Thin-profile displays are typically less than four inches thick, consuming less space than CRT's. Thin-profile displays are lighter in weight, consume less power, generate less heat and flicker less than many comparable CRT displays.

One drawback of thin-profile displays on the market today is that the screen has a rather narrow viewable angle compared with CRT's that can are normally viewed at a wider angular range. Accordingly, what is desired is a thin-profile display that is readily adjustable in orientation and position to accommodate a user.

The demand for ergonomically designed computer interfaces has increased as users spend more hours per day in front of a computer. Accordingly, what is desired is a display that is adjustable in position and orientation. What is also desired is a way of removeably attaching a thin-profile display to a base to enable movement of the display from the base, to another base, for example. What is also desired is a display that conserves space.

SUMMARY OF THE INVENTION

A desktop computer system includes a computer housing having a top, a bottom and lateral sides. The housing includes a thin-profile display and a post having ends. One end of the post removeably attaches to the computer housing. The other end extends from the computer housing to support the thin-profile display.

The post can removeably attach to the computer housing in any of a number of ways, including attachment to the top the computer housing, the bottom and the sides. According to one aspect of the invention, where the post attaches to the top of the housing, the top of the housing is reinforced and includes corrugated portions. The corrugated portions have fingers that extend radially from the post to reinforce the top.

The post has an adjustable length to raise and lower the display and thereby make the display vertically adjustable to accommodate computer system users of varying heights and various display height preferences. Adjustable height is particularly important with LCD displays that are not readily viewed except at a viewing angle generally perpendicular to the display screen.

The display rotatably attaches to the post to enable a user to adjust the pitch of the display. Further, the post rotatably attaches to the base to enable the display to axially rotate with respect to the computer housing. According to one aspect of the invention, the post includes discrete telescoping tubes that extend, retract and rotate with respect to each other. According to another aspect of the invention, the display includes a video cable and the computer housing includes a video card. The video cable extends from the display, through the post, and into the computer housing. The video card includes an internal connector and video cable couples the display with the internal connector.

According to another aspect of the invention, the display includes a speaker and a sound cable. The computer housing includes a sound card. The sound cable extends from the speaker, through the post, and into the computer housing. The sound card includes an internal connector. The sound cable couples the speaker with the internal connector.

It can be appreciated that the post of the present invention includes posts of various shapes and configurations. For example, the post may be flattened, or may include multiple posts. The post may mount on the top, rear or rear corner of the housing. Preferably, the post and display are removable from the computer housing to enable transport and storage of the computer system.

DETAILED DESCRIPTION OF THE INVENTION

Figure 1:
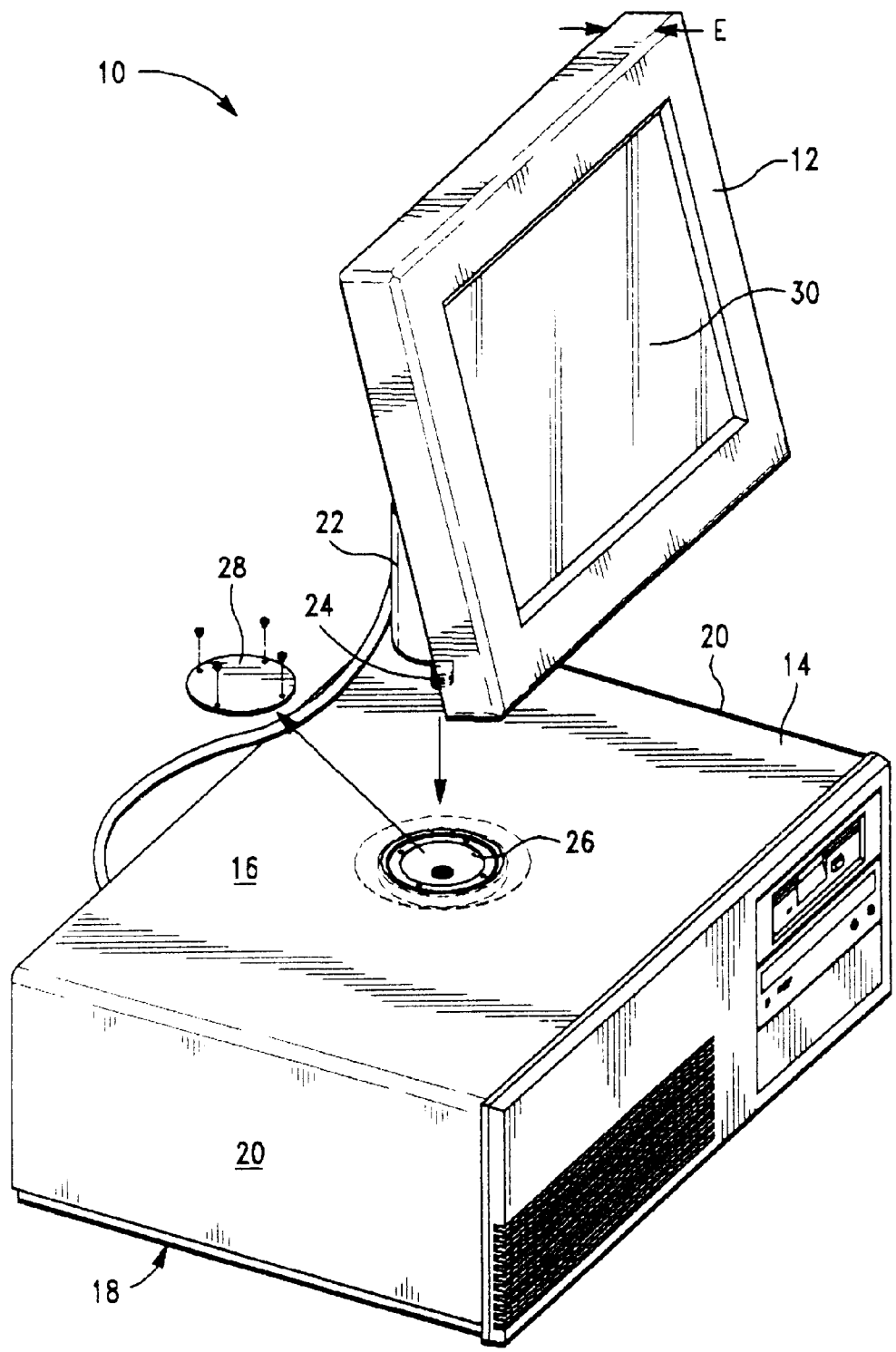
FIG. 1 is a perspective view of a thin-profile display and a desktop computer in accordance with the present invention.

FIG. 1 shows a desktop computer system generally designated with the reference numeral 10. The system 10 includes a thin-profile display 12 and a desktop computer housing 14. The computer housing has a top 16, a bottom 18, lateral sides 20 and a post 22 attachable to the top 16. The thin-profile display 12 attaches to the post 22.

The post 22 has a threaded end 24 and the top 16 includes a mount 26 for receiving the threaded end 24 of the post 22. The computer housing 14 also includes a cover plate 28 for covering the mount 26 when the post 22 and display 12 are removed from the computer housing 14.

The mount 26 has threads that mate with the threads of the post 22. This threaded engagement enables the post 22 to rotate with respect to the mount 26. Accordingly, the post 22 rotatably attaches to the mount 26 of the computer housing 14.

The display has a profile thickness "t" of less than four inches. Preferably, the display includes a LCD screen 30.

Figure 2:
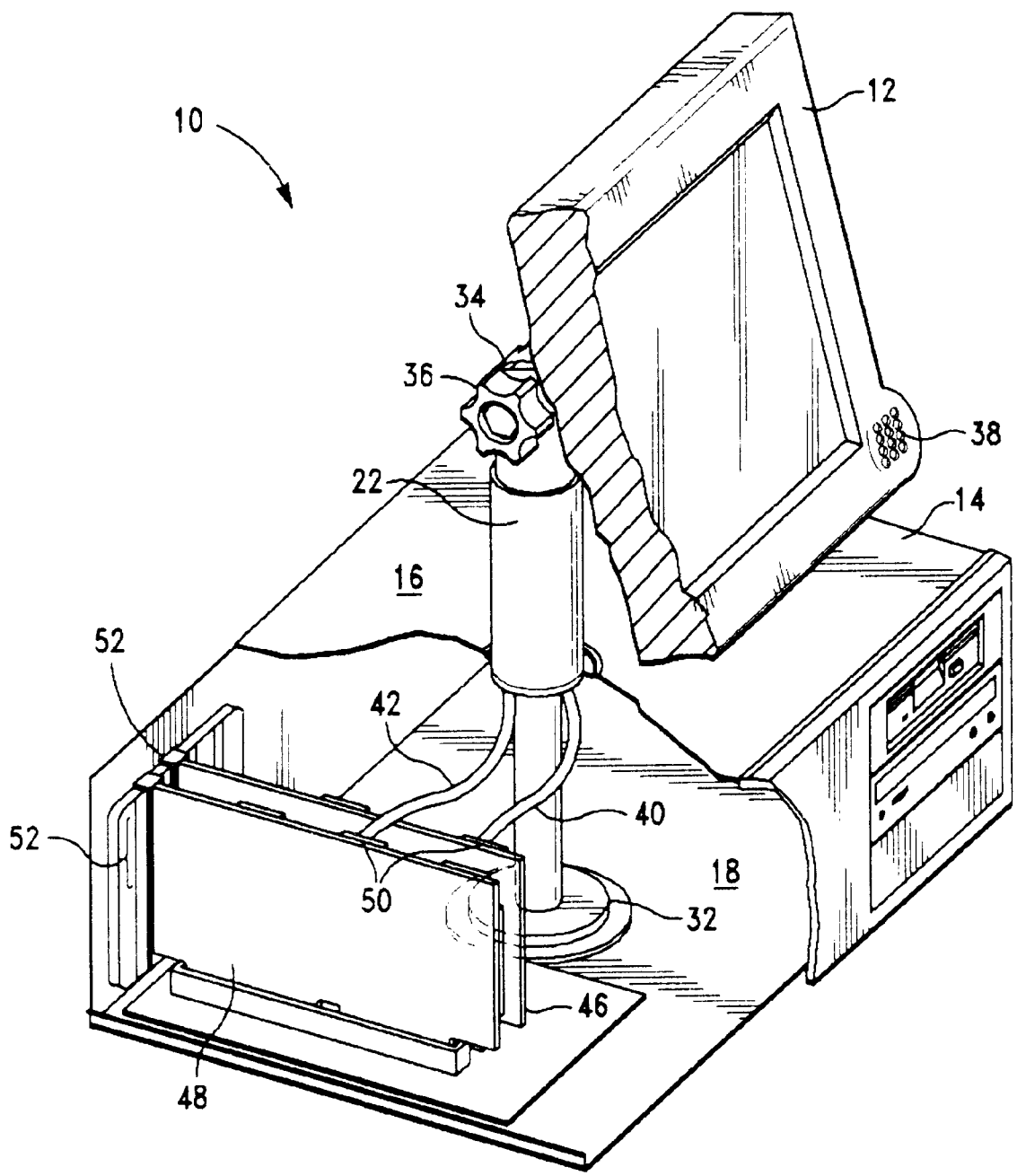
FIG. 2 is a perspective view of a thin-profile display attached to the bottom of a desktop computer housing in accordance with the present invention.

FIG. 2 shows a computer system 10 in accordance with the present invention. The display 12 attaches to the computer housing 14. The post 22 has an end 32 and an end 34. The end 32 rotatably attaches to the bottom 18 of the computer housing 14. The end 34 of the post 22 extends through the top 16 of the computer housing 14. The thin-profile display 12 attaches to the second end 34 of the post 22. The post 22 rotatably attaches to the bottom 18 of the computer housing 14 to enable the display to turn, adjusting orientation with respect to a user. The post 22 is rotatable with respect to the bottom 18 of the housing 14. It can be appreciated, however, that the post 22 may employ alternate configurations to enable rotation of the display 12. Such alternate configurations may include a telescoping tube, or tubes that rotate and telescope.

The second end of the post 34 includes an adjustment mechanism 36 that allows the display 12 to rotate with respect to the post 34. Accordingly, the display 12 has an adjustable pitch to accommodate a user. It can be appreciated that the adjustment mechanism 36 may include a ball and socket joint to enable multiple degrees of freedom and motion.

The display 12 includes a speaker 38, a speaker cable 40 and a video cable 42. The computer housing 14 includes a video card 48 and a sound card 46. The video cable 42 and the sound cable 40 extend from the display 12, through the post 22, and into the computer housing 14.

The video card 48 and the sound card 46 each have internal connectors 50 and external connectors 52. The video cable 42 couples the display 12 with the internal connector 50 of the video card 48. The speaker cable 40 couples the speaker 38 with the sound card 46. Accordingly, the post 22 protects both the speaker cable 40 and the audio cable 42 and shields the cables 40 and 42 from view. It can be appreciated that the post 22 can similarly protect power a power cable extending from a power supply to the display 22.

It can be appreciated that while video and audio cards are shown having connections to the video and sound cables, respectively, that a motherboard can be configured in accordance with the present invention to have connections for video and audio control.

The desktop computer housing 14 is generally rectangular in shape having the top 16 and bottom 18 being the largest surfaces defined by the housing 14. The bottom 18 is thus, particularly suited for placement on a planar surface such as a desktop.

Figure 3:
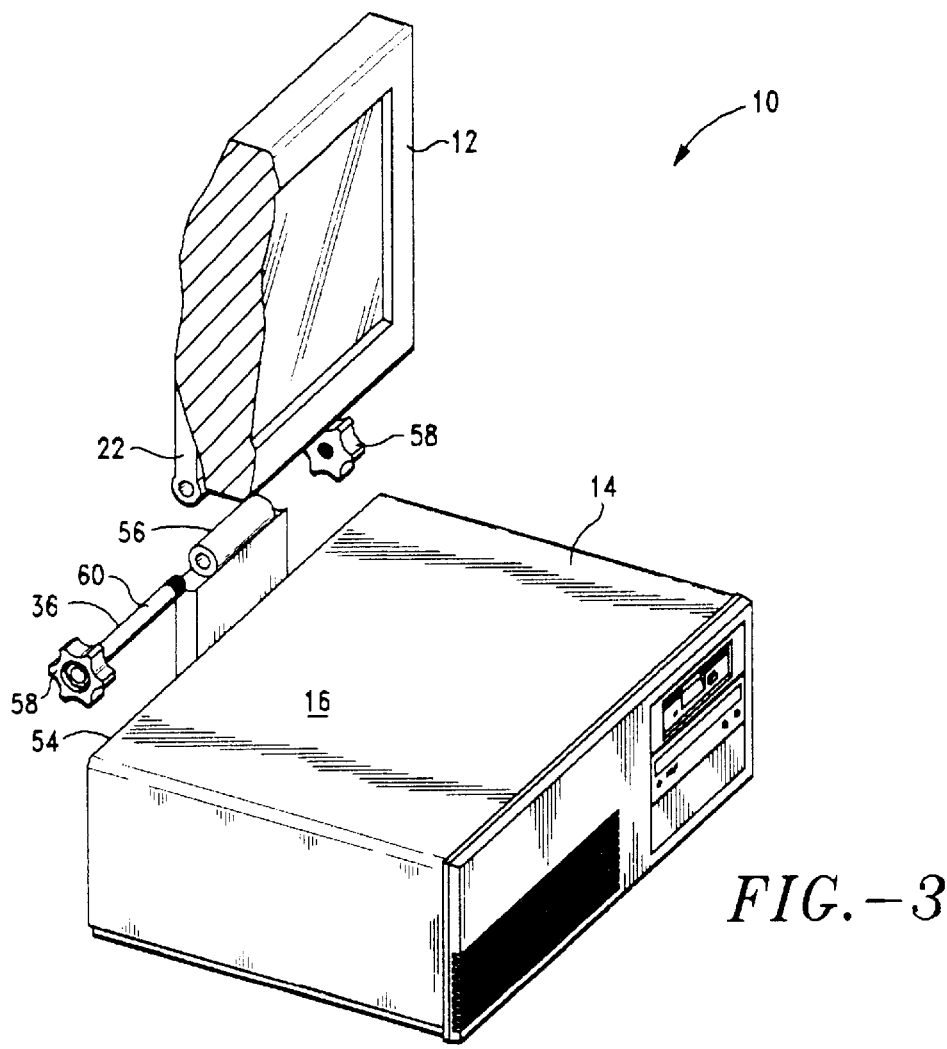
FIG. 3 is a perspective view of a folding display.

FIG. 3 shows a computer system 10 having the thin-profile display 12 in an upright position. The computer housing 14 has a rear edge 54. A hinge 56 mounts on the rear edge 54. The post 22 attaches to the hinge 56 and the display 12 attaches to the post 22. In the upright position, the post extends at an adjustable oblique angle with respect to the top 16 of the computer housing 14. The hinge 56 selectively folds the display 12 from the upright to a folded position as shown in FIG. 4.

The hinge 56 includes a threaded shaft 60 and an adjustment mechanism 36 for selectively securing the post 22 at a desired angle with respect to the computer housing 14. The shaft 60 has two ends. The adjustment mechanism 36 includes a pair of knobs 58 mounted on each end of the threaded shaft 60.

It can be appreciated that although the hinge 56 mounts on the rear edge 54, that the hinge 56 can also mount on the rear side, or top 16 of the computer housing 14 in accordance with the present invention.

Figure 4:
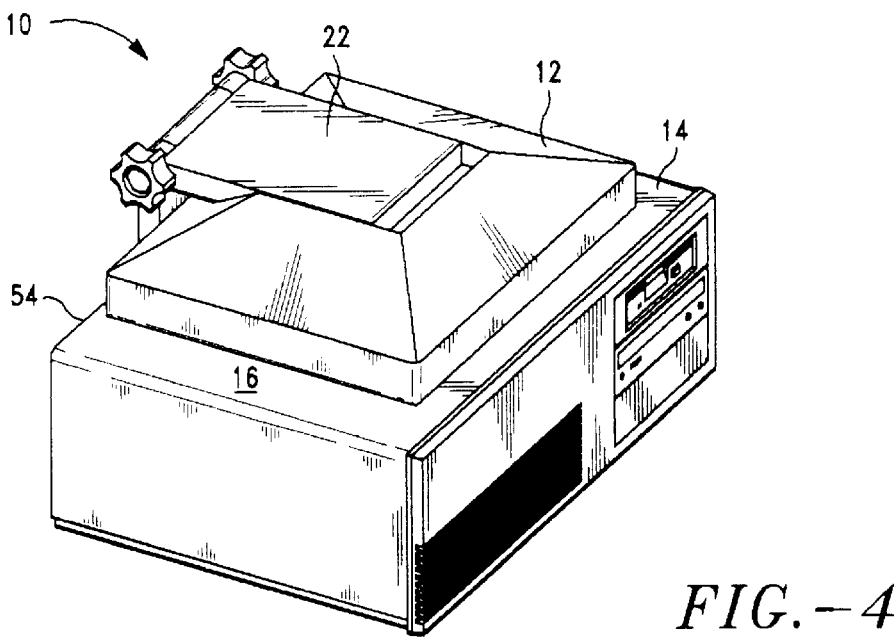
FIG. 4 is a perspective view of the display of FIG. 3 in a folded configuration.

FIG. 4 shows the post 22 in a folded position. In the folded position, the post 22 folds and the display 12 lies flat on the top 16 of the computer housing 14. The folded position protects the display 12 and reduces space consumed by the computer system 10.

It can be appreciated that the post 22 and display 12 are fixed with respect to each other. According to one aspect of the invention, the display 12 and post 22 are integrated. According to another aspect of the invention, the display 12 and the post 22 slide with respect to each other to enable the display 12 to be vertically adjustable.

Figure 5:
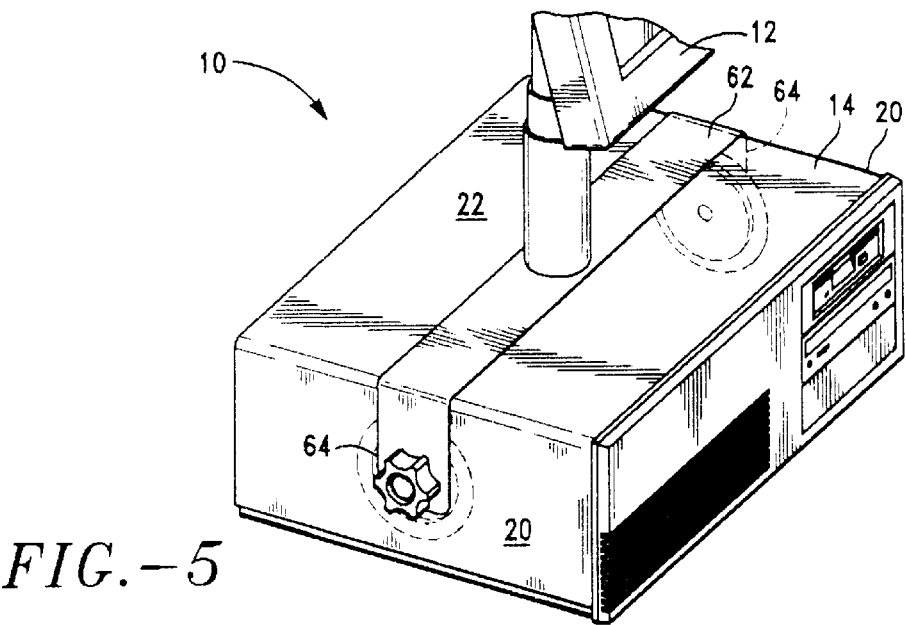
FIG. 5 is a perspective view of a display attached to the sides of a desktop computer in accordance with the present invention.

FIG. 5 shows a desktop computer system 10 having a bracket 62. The bracket 62 has two ends 64. Each end 64 attaches to a lateral side 20 of the computer housing. The post 22 attaches to the bracket 62, between the ends 64. Preferably the post 22 is midway between the ends 64. The post 22 has an adjustable length that telescopes to enable vertical adjustment of the display 12.

The ends 64 of the bracket 62 removeably and rotatably attach to the lateral sides 50 of the housing 14 to enable the bracket 62 to pitch the display with respect to the computer housing 14 and a user. The display 12 rotatably attaches to the post 22. Accordingly, movement of the display 12 with respect to the post 22, and movement of the bracket 62, distances and orients the display 12 in a desired position with respect to the computer housing 14.

Figure 6:
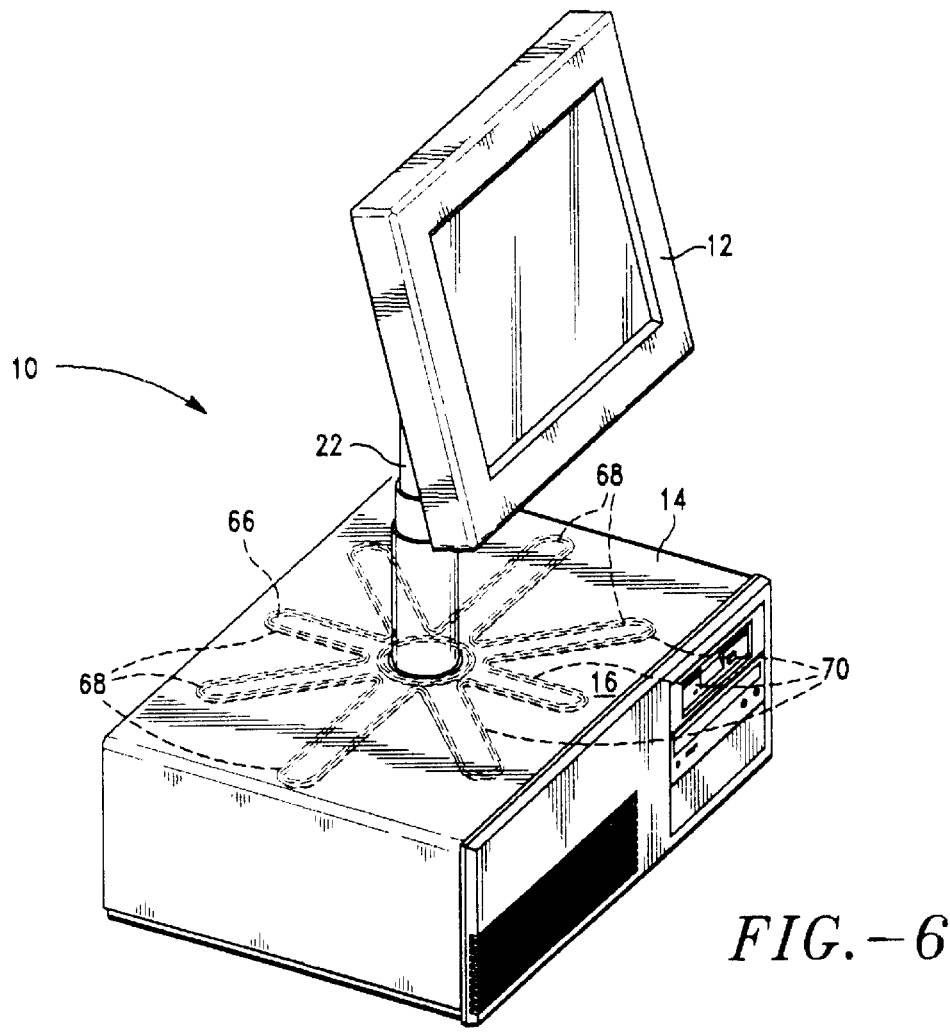
FIG. 6 is a perspective view of a desktop computer having a reinforced top in accordance with the present invention.

FIG. 6 shows the top 16 of the computer housing 14 having a corrugated portion 66 to reinforce the top 16 and thereby support the post 22 and the display 12. The corrugated portion 66 includes fingers 68 extending radially outward from the post 22. The fingers 68 each have edges 70 that weld under the top 16. The corrugated portion 66 is fabricated from steel to prevent undesired flexion of the top 16. The corrugated portion 66 is particularly useful for reinforcing the top 16 when an operator adjusts the display 12 orientation, or moves the computer housing 14 with the display 12 attached.

Figure 7:
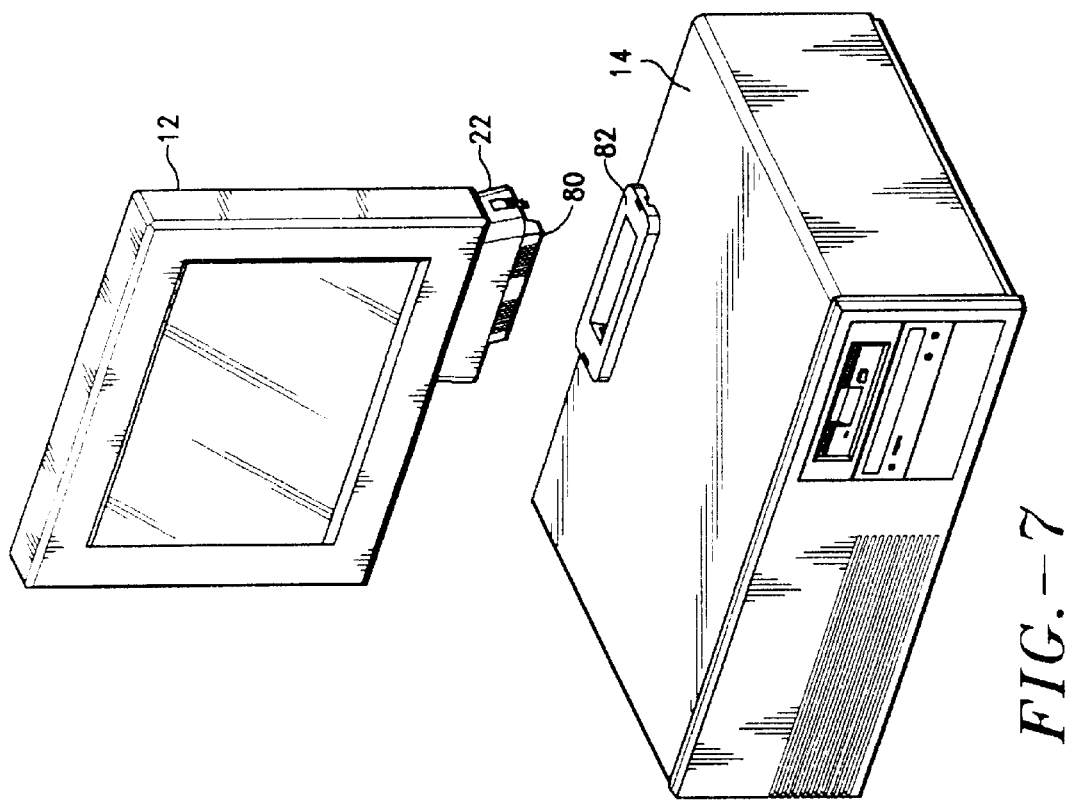
FIG. 7 is a perspective view of a thin-profile display exploded from a desktop computer in accordance with the present invention.

FIG. 7 shows a desktop computer system 10 with the display 12 and the post 22. The display 12 removeably connects to the computer system housing 14. The post 22 includes a wedge-shaped connector assembly 80. The housing 14 includes a fixture 82 for receiving the wedge-shaped connector assembly 80. The connector assembly 80 is generally wedge-shaped to facilitate alignment and electronic connection between the display 12 and the housing 14.

Figure 8:
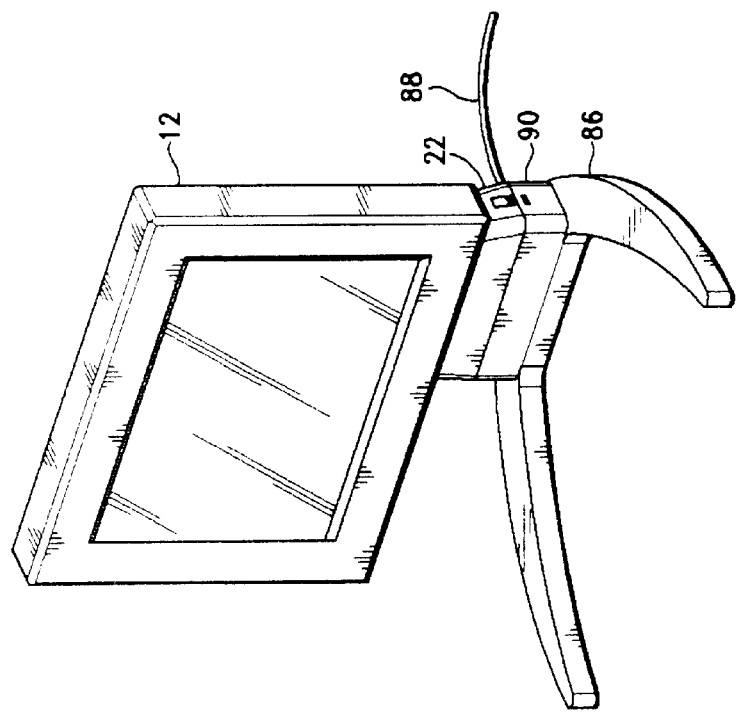
FIG. 8 is a perspective view of the thin-profile display of FIG. 7 attached to a base.

FIG. 8 shows the display 12 of FIG. 7, the post 22 and a base 86. The base 86 is crescent shaped to minimize space consumption of the base 86 on a desktop, for example. The base 86 has a central portion with a fixture 90. The post 22 extends from the fixture 90. The base 86 includes a cable 88 that interconnects the base 86 with a video signal source. The video signal source may include a computer or other device, for example. The fixture 90 receives the connector 80 (FIG. 7). Accordingly, the display 12 is swappable from the housing 14 (FIG. 7) to the base 86, and vice-versa. The base 86 enables adjustable placement of the display 12.

Figure 9:
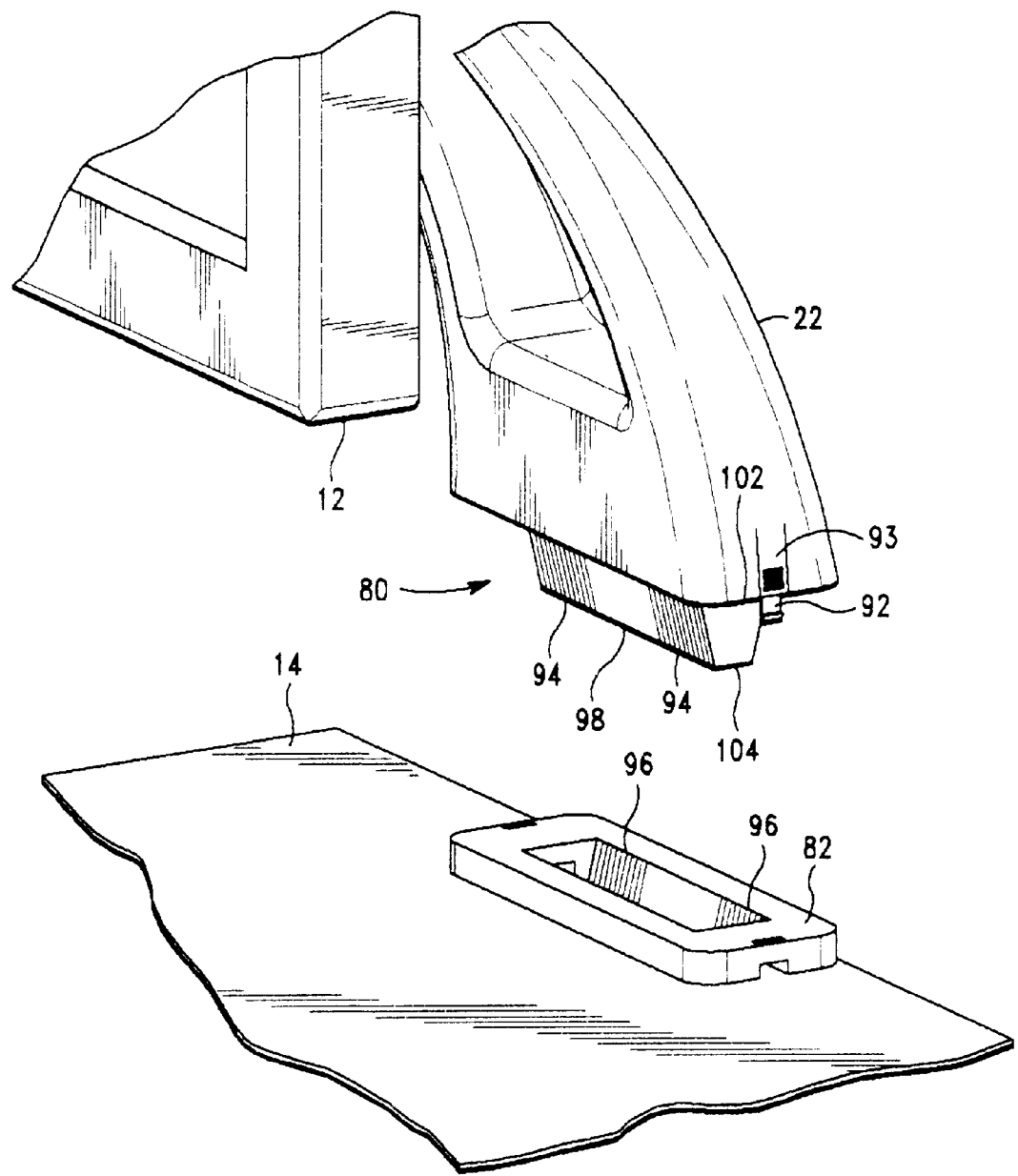
FIG. 9 is a perspective view of the connector assembly of the thin-profile display of FG. 7.

FIG. 9 shows the display 12 and the display post 22 and the connector assembly 80. The connector assembly 80 includes a body 98 and conductive contacts 94. The fixture 82 includes conductive contacts 96 for coupling with the conductive contacts 94 of the connector assembly 80.

The connector assembly includes clips 92 that clip the connector assembly 80 into the fixture 82. The clips 92 each have a textured grip 93, depressing the textured grip 93 flexes the clips 92, releasing the clips 92 from the fixture 82.

The body 98 of the connector assembly 80 includes a first end 102 and a second end 104. The body 98 tapers from the first end 102 to the second end 104, forming a wedge shape.

Insertion of the tapered end 104 into the fixture 82 aligns and guides the connector assembly 80 into a precise position with respect to the housing 14. The wedge shape of the connector body 98 presses the wedge against the fixture 82 to tightly support the post 22 and the display 12. Tightly supporting the post 22 inhibits movement of the post 22 with respect to the housing 14.

Figure 10:
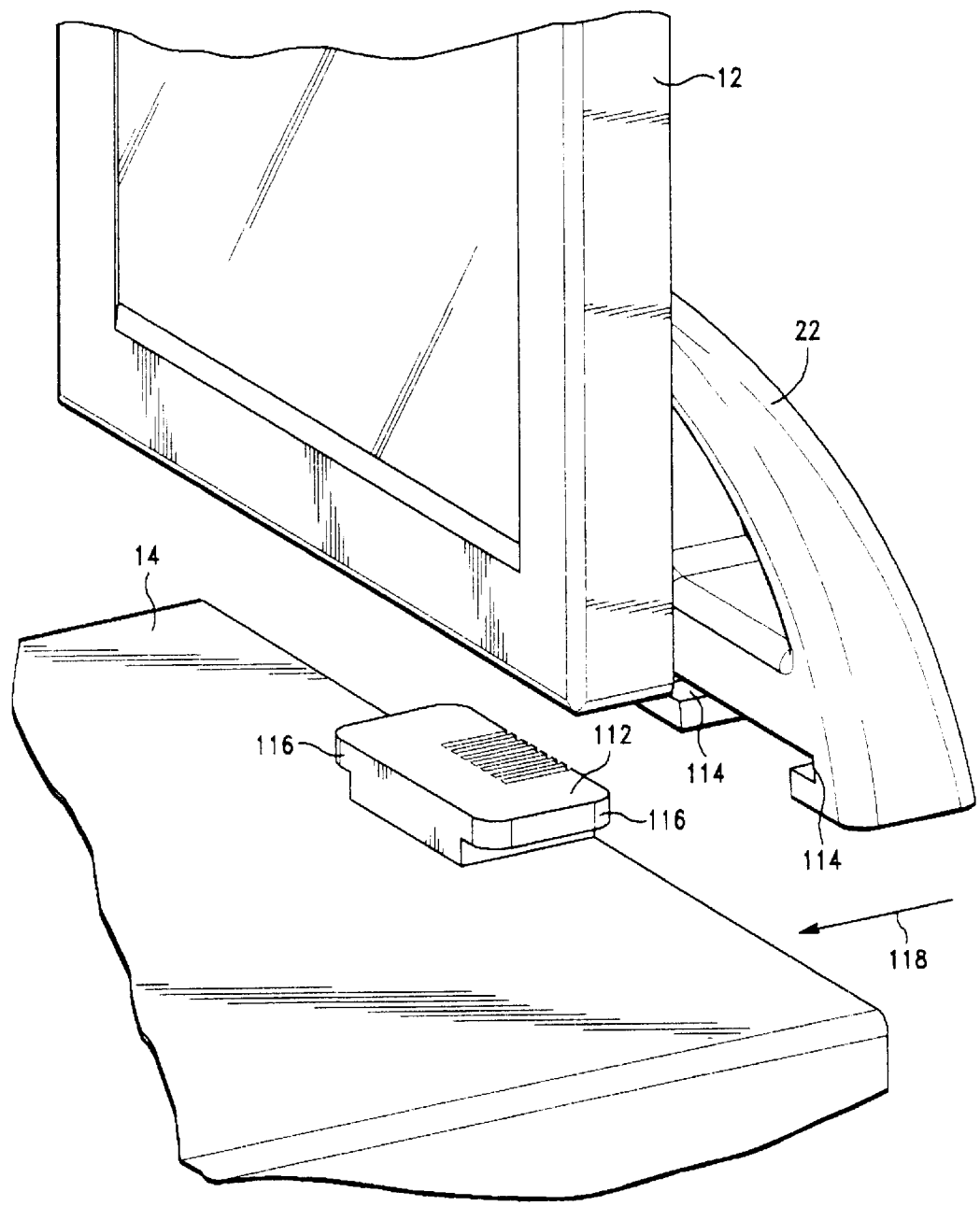
FIG. 10 is a perspective view of an embodiment of a connector assembly in accordance with the present invention.

FIG. 10 shows the housing 14 includes a fixture 112. The post 22 defines grooves 114. The fixture 112 includes tongues 116. The grooves 114 of the post 22 slide in parallel with the housing 14 (in the direction of the arrow 118) to mate with the tongues 116 of the fixture 112. Preferably, the fixture 112 has a "T" shaped cross-section and the grooves 114 of the post 22 form a "T" shaped cross-section to mate with "T" shaped cross-section of the fixture 112.

Figure 11:
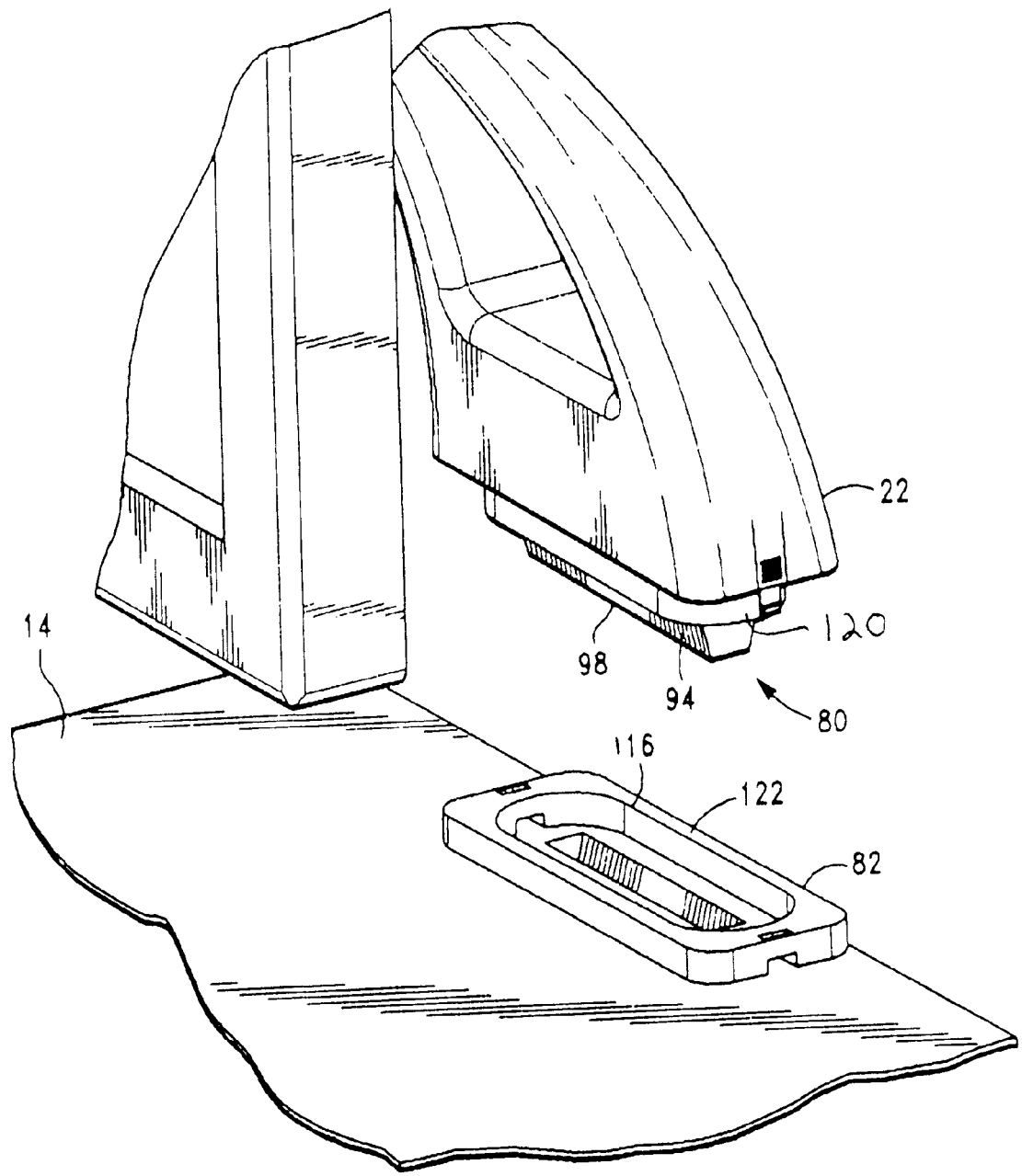
FIG. 11 is a perspective view of an embodiment of a connector assembly in accordance with the present invention.

FIG. 11 shows a variation of the connector assembly 80 including a reinforcing shroud 120 surrounding the connector body 98. The shroud 120 protects the contacts 94 when the connector assembly 80 is exposed. The fixture 82 includes a groove 122. The shroud 120 also aligns and guides the connector assembly 80 into the fixture 82. The connector assembly 80 communicates video signals and power between the housing 14 and the display.

This detailed description is presented by way of example only. Various modifications, additions and variations of the disclosed apparatus are possible. For example, there are many ways to interconnect a display post with housing in addition to sliding and press-fit interconnections. A rotatable interconnection is possible in accordance with the present invention. Accordingly, the invention is to be limited only by the claims below.

We claim:

1. A desktop computer system, comprising:
   a computer housing having a top, a bottom, lateral sides and a coverplate;
   a post removeably attached to the top of the computer housing, the post has a threaded end and the top of the computer housing includes a recessed mount;
   the coverplate is interchangeably attached to the top for covering the mount;
   a thin-profile display attached to the post, and
   the post threadedly attaches to the threaded mount of the computer to enable removal of the post from the computer housing, whereby when the post is removed from the computer housing the coverplate attaches to the top to cover the mount.

2. A desktop computer system as set forth in claim 1, wherein the post is adjustable in length.

3. A desktop computer system as set forth in claim 1, wherein the post foldably attaches to the top of the computer housing to enable the display to fold against the top.

4. A desktop computer system as set forth in claim 1, wherein the display rotatably attached to the post.

5. A desktop computer system as set forth in claim 1, wherein the post rotatably attaches to the computer housing.

6. A desktop computer system as set forth in claim 1, wherein the top includes a corrugated portion to reinforce the top and thereby support the post and the display.

7. A desktop computer system as set forth in claim 6, wherein the corrugated portion has fingers extending radially outward from the post.

8. A desktop computer system as set forth in claim 1, wherein the display has a profile thickness of less than four inches.

9. A computer system, comprising:
   a computer housing having a top, a bottom and lateral sides;
   a post having a first end and a second end, the first end being attached to the bottom of the computer housing, the second end of the post extending through the top of the computer housing; and
   a thin-profile display attached to the second end of the post.

10. A desktop computer system as set forth in claim 1, wherein the display includes a video cable and the computer housing includes a video card, the video cable extends from the display, through the post, and into the computer housing, the video card includes an internal connector, the video cable couples the display with the internal connector.

11. A computer system, comprising:
   a computer housing having a top, a coverplate, a bottom, a post and lateral sides;
   the top of the computer housing defines an open mount and receives the post through said open mount, with post extending through the top of the computer housing and attached to the bottom of the computer housing,
   the post having a first end and a second end, the first end being removeably attached to the bottom of the computer housing, the second end of the post extending through the top of the computer housing;
   a thin-profile display attached to the second end of the post and
   the coverplate removeably attaches to the top of the computer housing to cover the open mount when the post is removed from the housing.

12. A desktop computer system as set forth in claim 11, wherein the display includes a speaker and a sound cable, the computer housing includes a sound card, the sound cable extends from the speaker, through the post, and into the computer housing, the sound card includes an internal connector, the sound cable couples the speaker with the internal connector.

13. A desktop computer system as set forth in claim 11, wherein the post has an adjustable length.

14. A desktop computer system as set forth in claim 11, wherein the display rotatably attaches to the post.

* * * * *